Nov. 11, 1952        R. C. RICHARDS        2,617,319

APPARATUS FOR COLD-REDUCING TUBULAR METAL STOCK

Filed Feb. 24, 1949        6 Sheets-Sheet 1

*Inventor:*
RAYMOND C. RICHARDS,
BY: Donald G. Dalton
*his Attorney.*

Inventor:
RAYMOND C. RICHARDS,
BY: Donald G. Dalton
his Attorney.

Nov. 11, 1952 — R. C. RICHARDS — 2,617,319
APPARATUS FOR COLD-REDUCING TUBULAR METAL STOCK
Filed Feb. 24, 1949 — 6 Sheets-Sheet 5

Inventor:
RAYMOND C. RICHARDS,
BY: Donald G. Dalton
his Attorney.

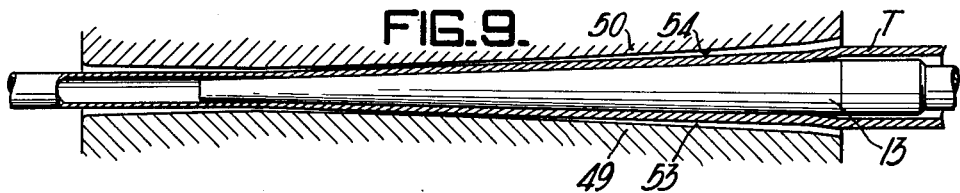
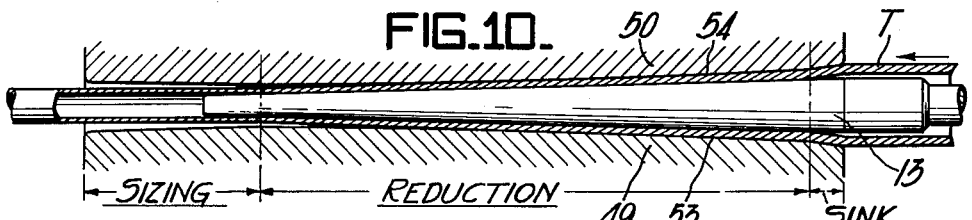
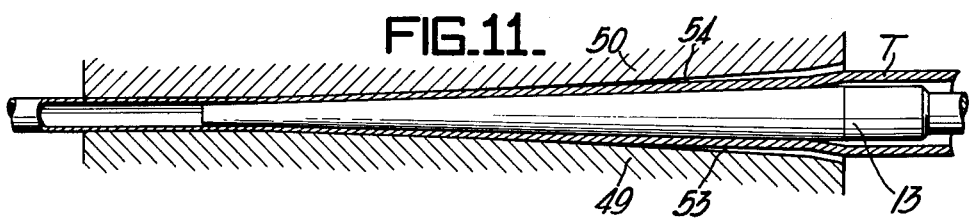
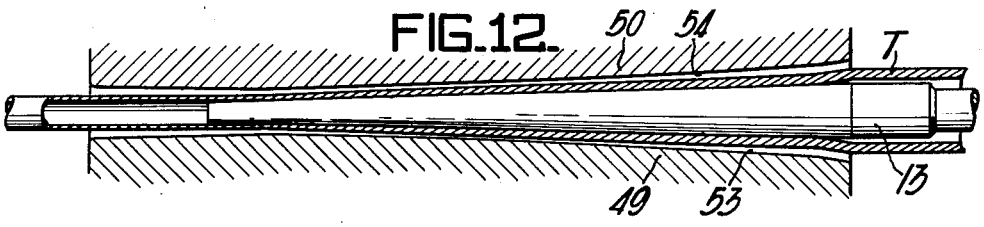
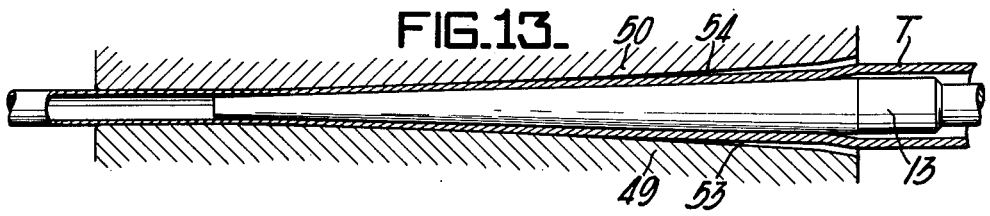
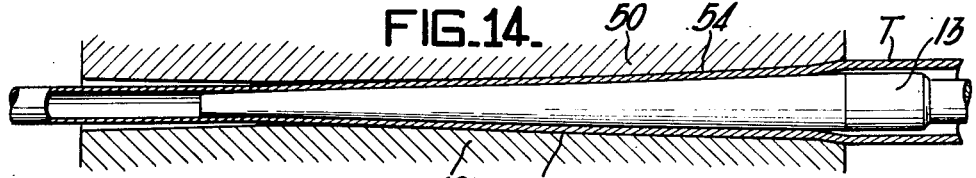
Inventor:
RAYMOND C. RICHARDS,
BY: Donald G. Dalton
his Attorney.

Patented Nov. 11, 1952

2,617,319

UNITED STATES PATENT OFFICE 2,617,319

APPARATUS FOR COLD-REDUCING TUBULAR METAL STOCK

Raymond C. Richards, New Brighton, Pa., assignor to United States Steel Company, a corporation of New Jersey Application February 24, 1949, Serial No. 78,134

3 Claims. (Cl. 78—14)

This invention relates to apparatus and methods for cold-reducing tubular metal stock.

The usual practice in cold-reducing tubular stock involves fitting a tapering mandrel within the bore of such stock and applying swaging dies to the exterior, while intermittently rotating the stock and feeding it forward on the mandrel. The operation thus reduces both the diameter and the wall thickness of the stock. A typical prior apparatus and method for performing these operations are disclosed in Neuberth Reissue Patent No. 18,329, dated January 12, 1932.

An object of the present invention is to provide improved apparatus and methods for cold-reducing tubular stock in which the mechanism is greatly simplified over any previous mechanism for this purpose with which I am familiar.

A further object of the invention is to provide improved apparatus and methods for cold-reducing tubular stock in which the mechanism is driven continuously, thus eliminating starting and stopping stresses and vibrations of mechanisms which are driven intermittently, as in previous apparatus with which I am familiar.

A further object of the invention is to provide improved apparatus for cold-reducing tubular stock in which the structure that bears the major stresses in stationary and fixed to a solid foundation rather than being a movable element, as in previous apparatus with which I am familiar.

A further object of the invention is to provide improved apparatus for cold-reducing tubular metal stock in which the swaging dies are mounted in a continuously rotatable housing and are rocked against the workpiece by cam action, the cams being carried in a fixed support, thus furnishing an apparatus which is smooth running, simple mechanically and very rugged.

In accomplishing these and other objects of the invention, I have provided improved details of structure, preferred forms of which are shown in the accompanying drawings, in which:

Figures 9 to 14 inclusive are partial longitudinal sectional views of the swaging dies illustrating six stages of the operating cycle of the apparatus.

The tube reducing apparatus of the present invention comprises a base 10 fixed to a solid foundation and a complementary bearing cap 12 fixed to said base. The interiors of the base and cap have mating semi-circular recesses which together form a bearing of circular cross-section. A tapering mandrel 13 is supported for free rotation in a fixed longitudinal position co-axially with said bearing by outside support means, not shown. A workpiece T of tubular metal stock fits over said mandrel and extends through the base and cap. The workpiece is fed forward intermittently by outside feed mechanism, not shown. The mechanisms which support the mandrel and feed the workpiece may be of any standard construction and per se are not part of the present invention.

Figure 1:
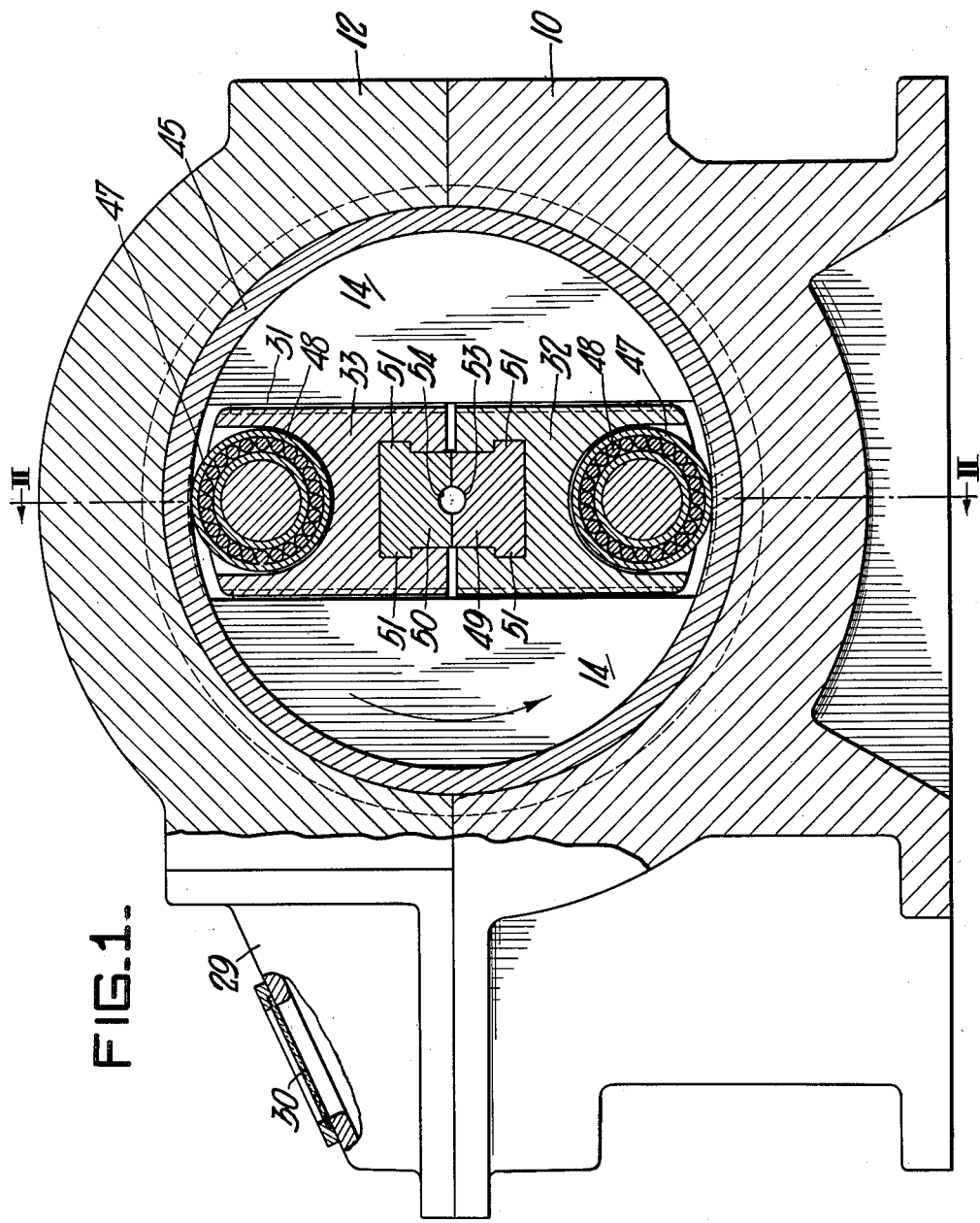
Figure 1 is a front elevational view, partly in section taken on line I—I of Figure 2, illustrating an improved tube reducing apparatus which embodies features of the present invention.
Figure 3:
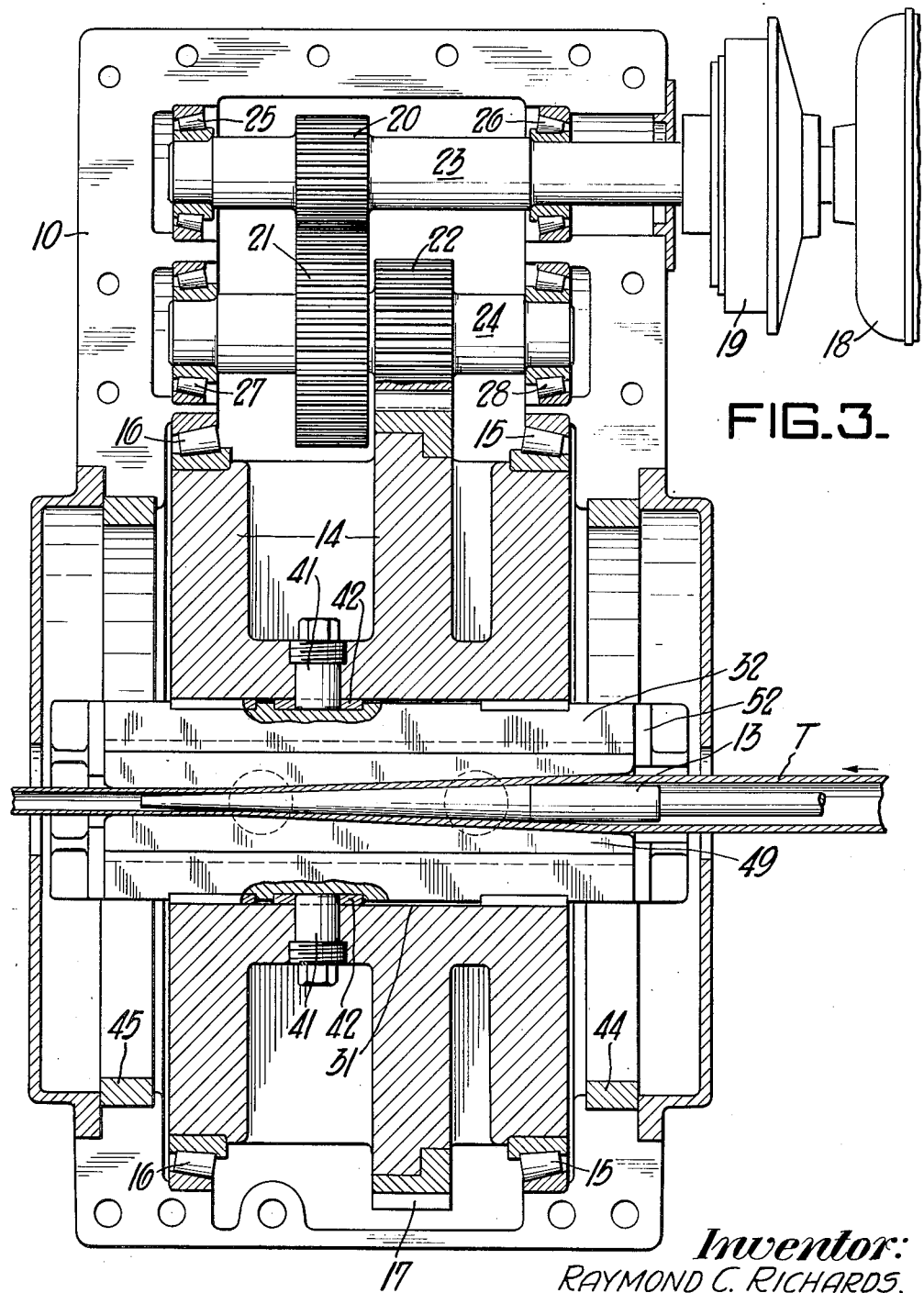
Figure 3 is a horizontal sectional view of the apparatus taken substantially on line III—III of Figure 2.
Figure 4:
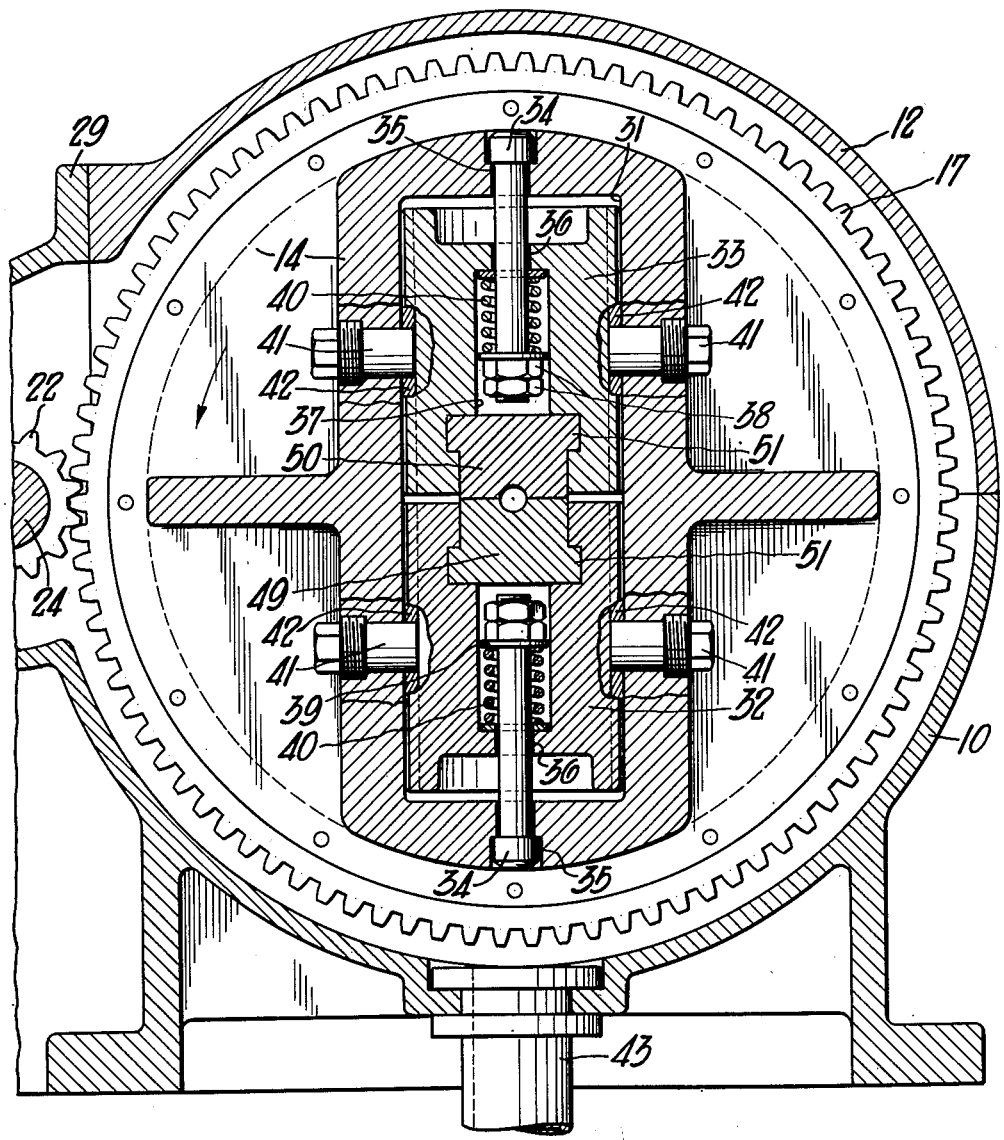
Figure 4 is a vertical cross-sectional view of the apparatus taken substantially on line IV—IV of Figure 2.

A housing 14 is mounted within the bearing formed by the recesses in the base and cap, preferably on anti-friction bearing races 15 and 16, and rotates co-axially with mandrel 13. A ring gear 17 is fixed to the outer periphery of the housing. A motor 18 drives said housing. The driving connection between the motor and the ring gear preferably includes a releasable clutch 19 and speed reducing gears 20, 21 and 22, the last of which meshes with the ring gear (Figure 3). These gears are carried on shafts 23 and 24, which are rotatably mounted in anti-friction bearing races 25, 26, 27 and 28 in base 10. Preferably these gears, shafts and bearing races are enclosed by a separate cover piece 29 fixed to base 10 to permit access without disturbing cap 12 (Figures 1 and 4). Cover piece 29 conveniently has a window 30 through which the gears can be inspected. For purposes of describing the operation, the rotation of the housing is illustrated as counter-clockwise as viewed from the back, although obviously the direction may be reversed without affecting the operation.

Figure 2:
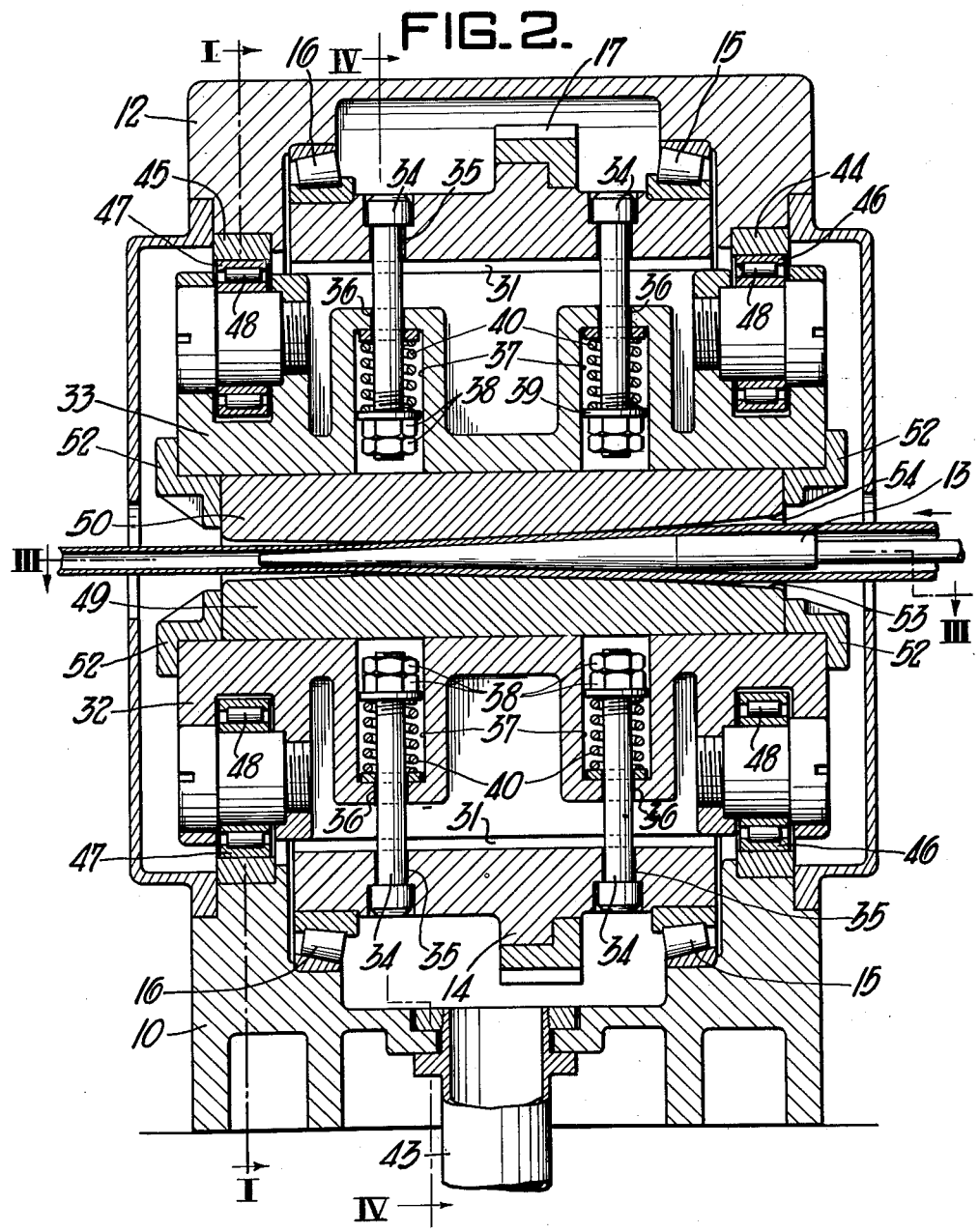
Figure 2 is a vertical longitudinal sectional view of the apparatus taken substantially on line II—II of Figure 1.

The interior of housing 14 has a rectangular opening 31 within which a pair of die holders 32 and 33 are mounted, one on each side of mandrel 13. A pair of bolts 34 retain each die holder within the housing in a manner which enables the die holders to be rocked radially of the housing (Figures 2 and 4). These bolts extend through bores 35 in the housing and bores 36 and counter-bores 37 in the die holders. The ends of these bolts carry nuts 38 and washers 39 within counter-bores 37. Compression springs 40 surround bolts 34 in the space between washers 39 and the bottoms of the counter-bores 37 and thus urge the die holders away from the mandrel and to their outer-most positions in housing 14. Clearance between the bolt shanks and bores 35 and 36 is sufficient not to interfere with rocking movement of the die holders. Pivot pins 41 prevent relative longitudinal movement between the die holders and the housing (Figures 3 and 4). These pins are fixed to the housing and extend into opening 31 perpendicularly to bolts 34. The ends of these pivot pins are rotatably received in keys 42 on which the die holders are radially slidable. Therefore the pivot pins do not interfere with radial or rocking movement of the die holders within the working limits of the apparatus.

Commonly the operation requires that the workpiece be cooled with a liquid coolant, which may be introduced through sprays, not shown, but situated at either end of the housing. The bottom of the base has a coolant drain 43, preferably situated midway of its length where the stresses are small (Figures 2 and 4).

Circular back and front cam rings 44 and 45 are fixed within the back and front interior peripheries of the bearing formed by the base and cap (Figures 2 and 3). These cam rings have interior cam surfaces, the details of which are explained hereinafter. Each die holder 32 and 33 has a back cam follower 46 and a front cam follower 47 which engage the cam surfaces of the respective cam rings (Figure 2). Preferably said cam followers are rotatably mounted on anti-friction bearings 48 carried on bearing bolts threadedly secured to the housing. Springs 40 tend to hold the cam followers in engagement with the cam surfaces and, when the housing is rotating, are assisted by the centrifugal force of the die holders.

Die holders 32 and 33 support swaging dies 49 and 50 respectively which are of similar construction and are removable and replaceable. The dies have longitudinal tapering flanges 51 and the die holders have complementary grooves in which said flanges are wedged (Figures 1 and 4). The ends of the grooves are closed by caps 52 fixed to the die holders (Figure 2). The thin edges of the flanges are toward the front so that forward movement of the workpiece wedges the dies into tighter engagement with the die holders. The dies have mating swaging surfaces 53 and 54 which together surround the workpiece and mandrel. Each of these surfaces is substantially semi-circular in cross-section and tapers toward the front in longitudinal section, the taper being in the same direction as that of the mandrel and having a curvature constructed about a large radius. In accordance with usual design, the swaging dies have a sink region, a reduction region and a sizing region, indicated by legends in Figure 10. A housing of given size can accommodate dies of a wide range of sizes, wider than any previous apparatus of this nature with which I am familiar.

Figure 6:
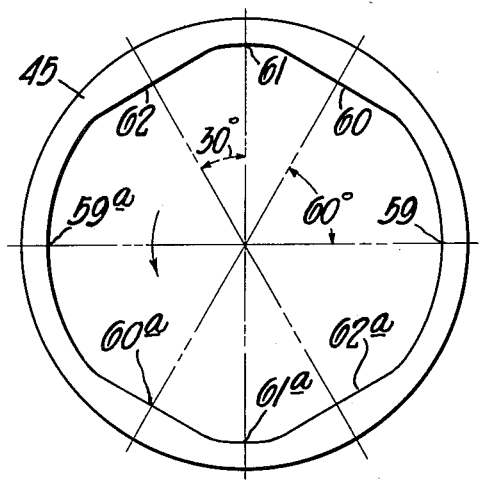
Figures 5 and 6 are end elevational views of the back and front cam rings employed in the apparatus, the camming surfaces being shown exaggerated to clarify their operation.
Figure 5:
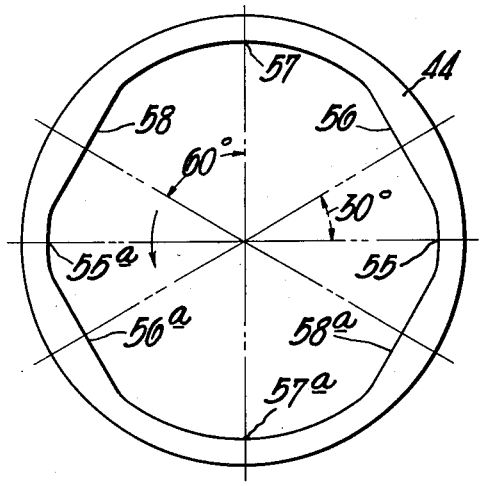

Figures 5 and 6 illustrate the details of one form of cam rings 44 and 45 which furnish an operating cycle of six stages, the camming surfaces being shown exaggerated to clarify their operation. Back cam ring 44 has diametrically opposed zero points 55 and 55a illustrated as located on the horizontal center line of the cam. Sequentially from these zero points this cam ring has a first diametrically opposed pair of regions of decreased radii 56 and 56a, the minima of which are about 30° counter-clockwise from these zero points, a second opposed pair of zero points 57 and 57a on the vertical center line, and a second diametrically opposed pair of regions of decreased radii 58 and 58a, the minima of which are about 60° counter-clockwise from the second zero points. Front cam ring 45 has opposed zero points 59 and 59a also located on the horizontal center line. Sequentially from these zero points this cam ring has a first diametrically opposed pair of regions of decreased radii 60 and 60a the minima of which are about 60° counter-clockwise from these zero points, a second opposed pair of zero points 61 and 61a on the vertical center line, and a second diametrically opposed pair of regions of decreased radii 62 and 62a, the minima of which are about 30° counter-clockwise from the second zero points.

It is seen that the zero points and the regions of decreased radii are all in diametrically opposed pairs. The zero points on the back and front cam rings occupy similar arcuate positions. Thus all four cam followers engage zero points simultaneously and free the dies from the workpiece so that it can feed. The regions of decreased radii on one cam ring are arcuately offset from those on the other. Thus the dies rock against the workpiece as the cam followers traverse these regions. As the dies rock against the workpiece, they also rotate it along with the mandrel, these parts being free to rotate, but not otherwise driven.

Figures 9 through 14 illustrate the positions of the swaging dies with respect to the workpiece through the six stages of the operating cycle which cam rings 44 and 45 produce. Figure 9 shows the first stage, in which the two back cam followers 46 engage zero points 55 and 55a and the two front cam followers 47 engage zero points 59 and 59a, which in each instance are the zero points on the horizontal center line of the cam ring. The swaging surfaces 53 and 54 of the dies are clear of the workpiece and the latter feeds one step forwardly toward the left.

Figure 10 illustrates the second stage, in which the housing has rotated 30° counter-clockwise from the first stage illustrated in Figure 9. Back cam followers 46 now engage regions of decreased radii 56 and 56a on back cam ring 44 and force the back ends of the swaging surfaces 53 and 54 against the workpiece, which also rotates. Front cam followers 47 are commencing to move up on regions of decreased radii 60 and 60a on front cam ring 45.

Figure 11 illustrates the third stage, in which the housing has rotated 60° counter-clockwise from the first stage illustrated in Figure 9. Back cam followers 46 are clear of regions of decreased radii 56 and 56a on the back cam ring. Front cam followers 47 engage regions of decreased radii 60 and 60a on the front cam ring and force the front ends of the swaging surfaces against the workpiece. In moving from the second stage to the third stage, the swaging surfaces have rocked through their full length against the workpiece and thereby have effected a reduction, both in diameter and wall thickness.

Figure 12 illustrates the fourth stage, in which the housing has rotated 90° counter-clockwise from the first stage illustrated in Figure 9. The back cam followers engage zero points 57 and 57a on the back cam ring and the front cam followers engage zero points 61 and 61a on the front cam ring, which in each instance are the zero points on the vertical center lines. Therefore the swaging surfaces are again free of the workpiece, which stops rotating and feeds another step forwardly.

Figure 13 illustrates the fifth stage, in which the housing has rotated 120° counter-clockwise from the first stage illustrated in Figure 9. The front cam followers engage regions of decreased radii 62 and 62a on the front cam ring and thus again force the front ends of the swaging surfaces against the workpiece which also rotates. At the same time the back cam followers are commencing to move up on regions of decreased radii 58 and 58a on the back cam ring.

Figure 14 illustrates the sixth stage, in which the housing has rotated 150° counter-clockwise from the first stage illustrated in Figure 9. The back cam followers engage regions of decreased radii 58 and 58a on the back cam ring and force the back ends of the swaging surfaces against the workpiece. In moving between the fifth and the sixth stages, the swaging surfaces rock against the workpiece to effect reduction and this rocking is in the opposite direction from that between the second and third stages. Next the cam followers reach the first zero points and the cycle is repeated, each cycle requiring one-half revolution of the housing.

Figure 8:
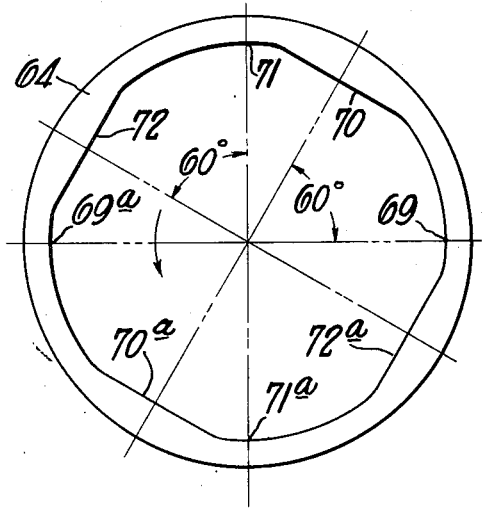
Figures 7 and 8 are end elevational views of modified cam rings which can be employed in the apparatus in lieu of those shown in Figures 5 and 6.
Figure 7:
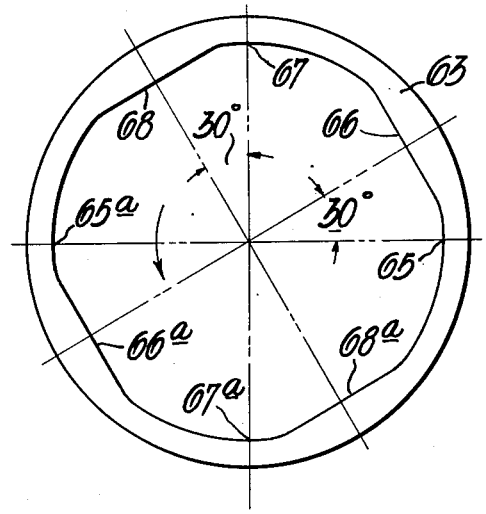

Figures 7 and 8 illustrate a modification in which the cam rings 63 and 64 furnish a three-stage operating cycle. The back cam 63 has an opposed pair of zero points 65 and 65a on its horizontal center line, an opposed pair of regions of decreased radii 66 and 66a the minima of which are about 30° counter-clockwise from these zero points, a second opposed pair of zero points 67 and 67a on the vertical center line, and a second opposed pair of regions of decreased radii 68 and 68a, the minima of which are about 30° counter-clockwise from the second zero points. The front cam ring 64 has an opposed pair of zero points 69 and 69a on its horizontal center line, an opposed pair of regions of decreased radii 70 and 70a, the minima of which are about 60° counter-clockwise from these zero points, a second opposed pair of zero points 71 and 71a on the vertical center line, and a second opposed pair of regions of decreased radii 72 and 72a, the minima of which about 60° counter-clockwise from the second zero points.

The modified arrangement of cam rings furnishes an operating cycle which repeats the first three stages previously described each quarter revolution of the housing, but does not produce the last three stages, in which the dies rock from front to back. Each operating cycle requiries one quarter revolution of the housing rather than a half revolution as in the first embodiment.

It is seen that with a suitable camming arrangement various other operating cycles may be worked out. Hence I do not wish to limit the present invention to any specific operating cycle so long as the cycle produces a rocking of the swaging surfaces against the workpiece, these surfaces being free of the workpiece at various stages so that feeding can take place.

From the foregoing description it is seen that the present invention provides an apparatus and method for cold-reducing tubular stock of especially simple construction and operation. The rotatable housing in which the dies are mounted is driven continuously, thus avoiding the vibrations and stresses of intermittently driven mechanisms. The base, cap and cam rings bear the principal stresses and these parts are mounted on a fixed foundation.

While I have shown and described only certain preferred embodiments of the invention, it is apparent that other modifications may arise. Therefore, I do not wish to be limited to the disclosure set forth but only by the scope of the appended claims.

I claim:

1. An apparatus for reducing elongated stock comprising a stationary base, a body mounted for rotation in said base, opposed dies mounted in said body for rotation therewith and for rocking movement toward and from each other, each die being elongated lengthwise of the stock, a pair of spaced stationary cam rings mounted on said base, one at each end of said dies and each surrounding the end portions of said dies and providing a varied cam pattern to the dies as they are rotated by said body, means on each die at each end thereof for engaging its corresponding cam ring for actuating the respective die ends in accordance with the cam pattern as said body rotates so that the dies can be brought together in a rolling action, that is, the entrance ends of the dies brought together followed by the exit ends brought together, and spring means for floatingly urging the cam engaging means on each die outwardly into engagement with the cam rings.

2. An apparatus for reducing elongated stock comprising a stationary base, a body mounted for rotation in said base, opposed die holders mounted in said body for rotation therewith and for rocking movement toward and from each other, opposed dies mounted on the inner faces of said die holders and being elongated lengthwise of the stock, a pair of spaced stationary cam rings mounted on said base, one at each end of said dies and each surrounding the end portions of said die holders and providing a varied cam pattern to the dies and die holders as they are rotated by said body, cam followers on each die holder at each end thereof for engaging its corresponding cam ring for actuating the respective die ends in accordance with the cam pattern as said body rotates so that the dies can be brought together in a rolling action, that is, the entrance ends of the dies brought together, followed by the exit ends brought together, and spring means for floatingly urging said cam followers into engagement with the cam rings.

3. An apparatus for reducing elongated stock comprising a stationary base, a body mounted for rotation in said base, opposed die holders mounted in said body for rotation therewith and for rocking movement toward and from each other, opposed dies mounted on the inner faces of said die holders and being elongated lengthwise of the stock, a pair of spaced stationary internal cam rings mounted on said base, one at each end of said dies and each surrounding the end portions of said die holders and providing a varied cam pattern to the dies and die holders as they are rotated by said body, rollers mounted on each die holder at each end thereof and riding on the corresponding cam ring for actuating the respective die ends in accordance with the cam pattern as said body rotates so that the dies can be brought together in a rolling action, that is, the entrance ends of the dies brought together followed by the exit ends brought together, and compression springs in said die holders urging said rollers into engagement with said cam rings.

RAYMOND C. RICHARDS.

REFERENCES CITED

The following references are of record in the file of this patent:

UNITED STATES PATENTS

| Number | Name | Date |
| --- | --- | --- |
| 16,630 | Platt | Feb. 10, 1857 |
| 475,077 | Bigney | May 17, 1892 |
| 654,590 | Baker | July 31, 1900 |
| 815,844 | Lightbody | Mar. 20, 1906 |
| 1,549,527 | Fielding | Aug. 11, 1925 |
| 1,819,376 | Muller | Aug. 18, 1931 |
| 2,247,863 | Tiedemann | July 1, 1941 |
| 2,280,352 | Penfold et al. | Apr. 21, 1942 |